| United States Patent [19] | [11] Patent Number: 4,911,241 |
| Williamson et al. | [45] Date of Patent: Mar. 27, 1990 |

[54] CONSTANT VISCOSITY FOAM

[75] Inventors: Trevor D. Williamson; Gary S. Strumolo, both of Tulsa, Okla.

[73] Assignee: Dowell Schlumberger Incorporated, Tulsa, Okla.

[21] Appl. No.: 303,600

[22] Filed: Jan. 27, 1989

[51] Int. Cl.$^4$ .................. E21B 43/26; E21B 43/267
[52] U.S. Cl. ................................ 166/308; 166/280; 166/309
[58] Field of Search ............... 166/271, 280, 308, 309; 252/8.551

[56] References Cited

U.S. PATENT DOCUMENTS

| 3,980,136 | 9/1976 | Plummer et al. | 166/308 X |
| 4,232,739 | 11/1980 | Franklin | 166/246 X |
| 4,439,333 | 3/1984 | House et al. | 166/278 X |
| 4,541,935 | 9/1985 | Constein et al. | 166/308 X |
| 4,569,394 | 2/1986 | Sweatman et al. | 166/308 X |
| 4,622,155 | 11/1986 | Harris et al. | 166/308 X |
| 4,627,495 | 12/1986 | Harris et al. | 166/308 X |
| 4,702,848 | 10/1987 | Payne | 166/308 X |

*Primary Examiner*—George A. Suchfield
*Attorney, Agent, or Firm*—Stephen A. Littlefield

[57] ABSTRACT

A method of preparing either foamed or nonfoamed fracturing fluids which maintain an at least substantially constant viscosity during the introduction of varying concentrations of proppant. The at least substantially constant viscosity fluids of the present invention provide a substantially constant friction pressure, which provides improved on-site, real-time analysis and to a better evaluation of the fracture treatment.

19 Claims, 2 Drawing Sheets

CONCENTRIC CYLINDER RHEOMETER

CONSTANT VISCOSITY FOAM

FIELD OF THE INVENTION

The invention relates to a method of fracturing subterranean formations penetrated by a wellbore and placing proppant material in the fractured formation.

TECHNOLOGY REVIEW

The treatment of subterranean formations penetrated by a wellbore to stimulate the production of hydrocarbons is well established. One of the most common methods of increasing productivity of a hydrocarbon-bearing formation is to subject the formation to a fracturing treatment. This treatment is effected by injecting a liquid, gas, or two-phase fluid which may be referred to as a fracturing fluid down the wellbore at sufficient pressure and flow rate to fracture the subterranean formation. A proppant material such as sand, fine gravel, sintered bauxite, glass beads or similar material can be introduced into the fractures, to keep them open. The propped fracture provides larger flow channels through which an increased quantity of hydrocarbon can flow, thereby increasing the productive capacity of a well.

A traditional fracturing technique is known as "foam fracturing." This process is described in, for example, U.S. Pat. No. 3,980,136. Briefly, foam fracturing involves generating a foam of a desired "quality" (generally defined as the volume fraction of the discontinuous phase) which is then introduced through the wellbore into the subterranean formation which is to be fractured. The composition of the foam is such that the foam "quality" at the bottom of the well is in the range from about 0.53 to 0.99. Various gases and liquids can be used to create the foam, but foams generally used are made from nitrogen and water, in the presence of a suitable surfactant. The pressure at which the foam is pumped into the well is such that it will cause a fracture of the hydrocarbon-bearing formation. Additionally, the foam comes out of the well easily when the pressure is released from the wellhead, because the foam expands when the pressure is reduced.

A further foam fracturing technique is described in U.S. Pat. No. 4,627,495. This further process involves fracturing fluids which are liquid-liquid emulsions of liquified carbon dioxide and an aqueous fluid at surface conditions. The emulsion is converted into a gas-in-liquid foam upon heating in the formation to a temperature above the critical temperature of carbon dioxide. The fracturing fluids comprise from 10 to 96% by volume carbon dioxide or nitrogen gas, and also contain a surfactant which is said to at least partially stabilize the emulsion and may contain gelling agents for additional stability. The volume of liquid carbon dioxide is adjusted as the volume of proppant material varies so as to generally maintain a constant internal phase ratio in the fracturing fluid. When nitrogen is used, a foam is produced on the surface by admixing gaseous nitrogen with the gelled fluid. The fracturing fluid having a generally constant internal phase ratio is said to be capable of transporting greater quantities of proppant than foams having a comparable foam quality. However, since fracturing fluid viscosity varies during the process, optimum proppant transport is not achieved.

It would be desirable to provide a further improved method by which a fracturing fluid can be created which will maintain an at least substantially constant viscosity over a broad range of proppant concentrations and is capable of carrying high concentrations of proppant into a subterranean formation.

SUMMARY OF THE INVENTION

The present invention provides an improved method of fracturing a subterranean formation penetrated by a wellbore. A major problem in predicting/interpreting pressure data during fracturing is to accurately reflect the effect of friction pressure. While this is difficult enough for fluids which exhibit this viscoelastic properties, the problem is exacerbated by the introduction of varying concentrations of proppant during fracturing treatment. The substantially constant viscosity foams of the present invention provide an at least substantially constant friction pressure, which in turn leads to improved on-site, real-time analysis and to a better evaluation of the fracture.

It is therefore an object of the present invention to provide a method of preparing a fracturing fluid which maintains an at least substantially constant viscosity during the introduction of varying concentrations of proppant.

It is another object of the present invention to provide a method of preparing a fracturing foam fluid which maintains an at least substantially constant viscosity during the introduction of varying concentrations of proppant.

These and other objects of the present invention are achieved by adjusting the amount and/or type of gelling agent in a fracturing fluid when the amount of proppant in the fracturing fluid is varied, according to the following formula:

$$\mu_{mL} \equiv \frac{\mu_m}{\mu_L} = \frac{\mu_m}{\mu_s} \frac{\mu_s}{\mu_p} \frac{\mu_p}{\mu_L}$$

The derivation and use of the above formula is described in detail below.

DETAILED DESCRIPTION OF THE INVENTION

The present invention provides a practical method and a theoretical basis for establishing a procedure of controlling viscosity in either foamed or nonfoamed fracturing fluid systems. The theoretical basis for the present invention will combine three formulae: one for the change in viscosity due to the addition of gel polymer, another for the viscosity of a proppant-laden polymeric fluid, and the third for the viscosity of a gas-liquid foam. The description begins with a relationship for the viscosity of a proppant-laden fluid. The ratio of the slurry to base polymeric liquid viscosity, $\mu_r$, is given by $$\mu_{mL} = \frac{\mu_s}{\mu_p} = \left(1 + (3n' - .65)\, e^{-.0005\gamma}\, \frac{1.25\,\phi}{1 - \phi/\phi_{max}}\right)^2 \quad (1)$$

where $$\phi = \frac{V_p}{V_p + V_L} = \frac{V_p}{V_s}$$

is the ratio of the volume of solids, $V_P$, to the volume of solids plus liquid, or the slurry volume $V_s$, $\phi_{max}$ is taken to be 0.68, and n' and $\dot{\gamma}$ are the power law exponent for the base liquid and the shear rate, respectively. This relationship has been derived for non-Newtonian hydroxypropyl guar-based fluids.

The second relationship used is that for the viscosity of a foam, given by Hatschek[1] as $$\mu_f = \frac{\mu_L}{1 - (h\Gamma)^{\frac{1}{3}}} \quad (2)$$

where h is taken to be 1.2 for foams and the quality $\Gamma$ is given by $$\Gamma = \frac{V_g}{V_g + V_L}.$$

$V_g$ and $V_L$ are the volume fractions of gas and liquid, respectively.

[1] "The general theory of viscosity of two phase systems," Hatschek, E., The Faraday Society Transactions, Vol. 9:80 1913–1915.

Equation (2) can be derived theoretically using the arguments of Frankel and Acivos[2] and considering the gas bubbles as solid spheres. As a test of this relationship, consider the data on simple foams measured at a high temperature and a high pressure.[3] Note first that the viscosity is a function of the shear rate (this does not appear in Hatschek's formula because he only considered shear rates sufficiently high where the viscosity remained independent of it). As a result, a least-squares fit to the data of the form $$\mu_f = \frac{\mu_L a}{1 - (b\Gamma)^{\frac{1}{3}}} \quad (2')$$

is made where a and b are constants to be determined. If the Hatschek formula holds true, a should vary with shear rate and b should be approximately 1.2. The results are shown in the following table and in FIG. 1:

[2] "On the Viscosity of a Concentrated Suspension of Solid Spheres," Frankel, N.A., and Acrivos, A., Chem. Eng. Sci. 22, pp. 847–853, 1967.
[3] "Rheological Properties of Foam Fracturing Fluids Under Downhole Conditions," Cawiezel, K. E., and Niles, T. D., SPE paper 16191.

TABLE 1

| | Least-squares parameter values at 400 and 800/sec. | |
|---|---|---|
| shear rate: | 400/sec | 800/sec |
| a | .948 | .646 |
| b | 1.16 | 1.15 |

Figure 1:
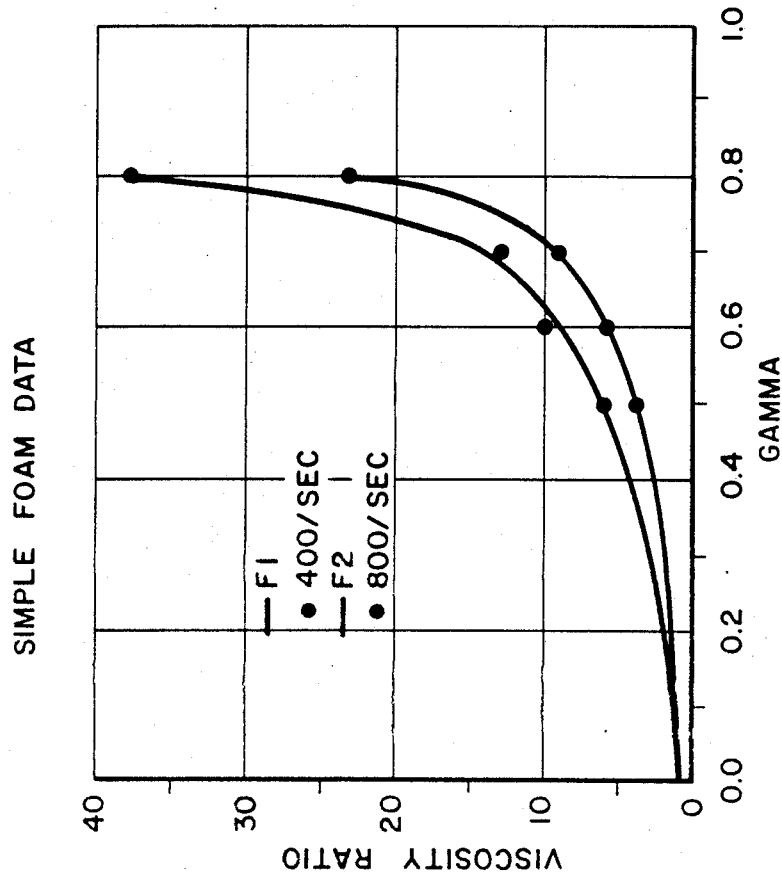
FIG. 1 illustrates a plot of viscosity ratio data (diamonds) as a function of foam quality for two shear rates and a corresponding least-squares fit (solid lines).

FIG. 1 illustrates a graph of viscosity ratio data (diamonds) as a function of foam quality for two shear rates and corresponding least-squares fits of functional foam (2') (solid lines). Note that with the least-squares fit, the values of b are very close to the prescribed value of 1.2 for h. The curves F1 and F2 in FIG. 1 use equation (2') and the values for the parameters a and b given in Table 1. They fit the foam data quite well.

Equation (2') is now modified slightly as described below to obtain the general formula which characterizes the present invention. The foam viscosity, $\mu_f$, is replaced by the viscosity of the three-phase mixture $\mu_m$ and the liquid viscosity $\mu_L$ by the slurry viscosity $\mu_s$ (previously defined), to obtain $$\mu_m = \frac{\mu_s a(\gamma)}{1 - (h\Gamma)^{\frac{1}{3}}}, \text{ where } \Gamma = \frac{V_g}{V_g + V_s}. \quad (2'')$$

The same formulae for the viscosity and quality hold except the liquid viscosity and volume are replaced by the slurry viscosity and volume. In addition, the viscosity relation has a scale factor a which is a function of the shear rate.

Finally, an equation is included that accounts for the viscosity increase due to the addition of a gel polymer, viz. hydroxypropyl guar. At a given shear rate, this can be represented by a polynomial in P, the polymer loading in lbs/Mgal, of the form:

$$\mu_p = \mu_L(1 + aP + bP^2) \quad (3)$$

where a and b are determined experimentally. Then multiplying equations (2''), (1), and (3) to get $$\mu_{mL} \equiv \frac{\mu_m}{\mu_L} = \frac{\mu_m}{\mu_s}\, \frac{\mu_s}{\mu_p}\, \frac{\mu_p}{\mu_L} \quad (4)$$

for the ratio of the viscosity of a three-phase mixture to base liquid viscosities. Equation (4) is the general formula which characterizes the present invention. The general formula (4) which characterizes the present invention gives a practical procedure for mixing gas, polymer, and proppant to control viscosity and maintain an at least substantially constant viscosity fracturing fluid while varying the amount of proppant.

For example, consider a unit volume, i.e., $V_L + V_g + V_P = 1$. Then $$\Gamma = V_g \text{ and } \phi = \frac{V_p}{1 - \Gamma}.$$

The foam quality will typically range between 0.75 and 0 and $\phi$ is generally less than 0.375, which corresponds to 20/40 mesh sand as a proppant to a loading of 12 pounds per gallon. These ranges represent typical field usage. The above relationships are inserted in general formula (4), which produces a four-dimensional surface of viscosity ratios as a function of gas volume, polymer concentration, and proppant loading. Holding one variable fixed then gives a contour plot of the three-dimensional reduced surface with lines of constant viscosity ratio in the remaining two variables. They are shown in FIG. 2 where the gas volume is fixed for each curve.

Figure 2:
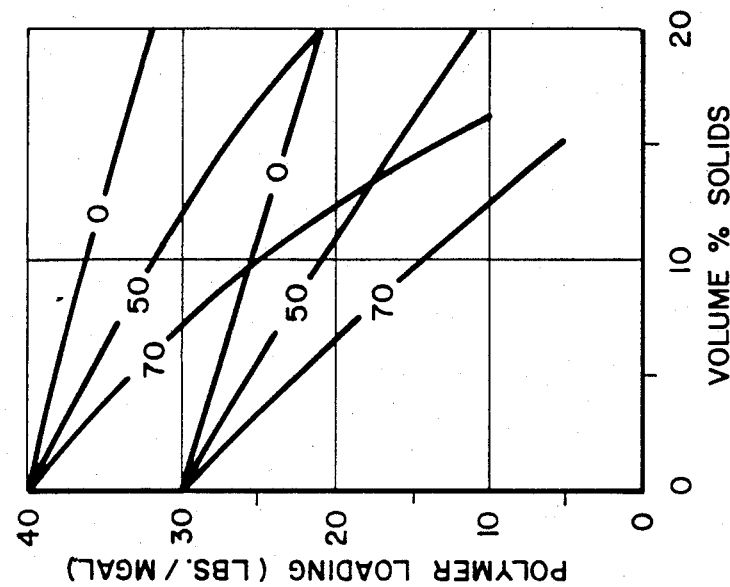
FIG. 2 illustrates constant viscosity contours according to equation (4) for specified gas volume percentages. Each curve shows how to change gel polymer concentration as proppant is added.

FIG. 2 illustrates constant viscosity contours derived from equation (4) for given gas volume percentages. The two sets of curves correspond to initially starting out with either 40 or 30 lbs. hydroxypropyl guar (as a gel polymer)/Mgal. Each curve shows how to change polymer concentration as proppant is added. The contours correspond to constant viscosity ratios. They give a practical and easy to use "recipe" for lowering polymer concentration as proppant is added in order to maintain a constant viscosity. It should be carefully noted that the foam quality can be set to zero and the same procedure will be valid. This is shown in FIG. 2 for the case of 0 gas volume. Thus the general formula which characterizes the present invention has applications which include both foam and non-foam fracturing treatments.

In order that those skilled in the art may better understand the present invention, the following examples are presented by way of illustration and not by way of limitation.

EXAMPLES

Figure 3:
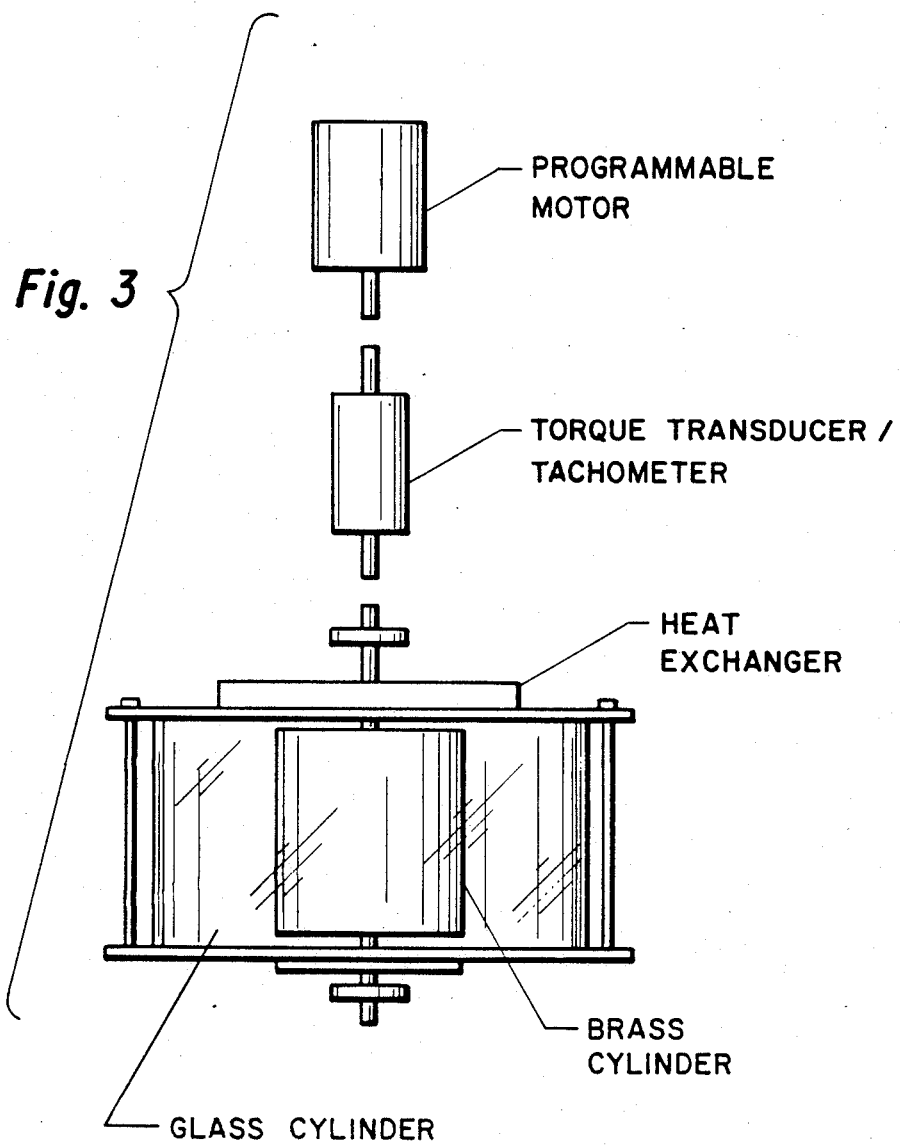
FIG. 3 illustrates a concentric cylinder rheometer (CCR).

The examples were carried out in a concentric cylinder rheometer (CCR) of the Couette-flow-type but where the inner cylinder rotates (see FIG. 3). The output shaft of a programmable motor was connected by successive flexible couplings to a torque transducer/tachometer, and then to the inner rotating cylinder. Torques values (lb-in) (equivalent to viscosity) were measured at various RPM (equivalent to shear rates).

Aqueous fluids comprising of an hydrated gelling agent in ratios of 10 to 40 lb. hydroxypropyl guar (HPG) per 1000 gallons in 2% potassium chloride solution, together with an appropriate surfactant system, for example, a blend of surfactant that includes a quaternary ammonium salt and ethoxylated alcohol of long chain carbon compounds at between 2 to 6 gallons per 1000 gallons were used. The particles used were neutrally buoyant 18–25 styrene divinyl benzene beads.

Volumes of fluids (and/or fluids and beads) needed to make 50, 60, and 70 quality foams were placed in the CCR. The remaining volume of air was flushed out with nitrogen gas and the CCR closed. A typical experiment would be as follows. Starting with a loading of 40 lb. per 1000 gallons of the above fluid, for say a 60 quality foam (that is, 40% by volume liquid and 60% nitrogen), a foam was created by rotating the inner cylinder at 2000, 1500, 1000 and 500 RPM respectively, allowing the foam to stabilize at each value after which the corresponding torque (viscosity) values recorded. The foam system was then replaced by a combination of a known percentage of beads and a fluid with a decreased gelling agent loading, the total volume of which again occupied 40% by volume of the CCR. The experiment was repeated and the values of the torques compared.

A series of tests on 50, 60, and 70 quality foams were conducted in the CCR. Starting with an HPG loading of 40 lb. per 1000 gallons in each case (hereinafter an SFS40 foam), polymer loading was decreased as proppant was added according to the contour lines in FIG. 2. The torque readings (units: lb-in) at different RPMs are shown on page 18, along with the % error (variation from the zero proppant case). The average of the absolute value of all errors over more than 50 measurements is less than 4%! This provides a powerful verification of the theoretical approach set forth in general formula (4) which characterizes the present invention. This series of tests also provides a convenient definition of an at least substantially constant viscosity fracturing fluid in the present invention. As used herein, an at least substantially constant viscosity fracturing fluid refers to a fracturing fluid which exhibits torque readings (units: lb-in) which vary not more than about ± 4% during the introduction of varying concentrations of proppant when tested in the CCR described above.

COMPARATIVE EXPERIMENTS

As described above, the fracturing fluid having a generally constant internal phase (CIP) ratio described in U.S. Pat. No. 4,627,495 does not achieve optimum proppant transport. This is demonstrated by a 70 quality foam which shows a dependence of torque with loading as the constant-viscosity contours do not remain straight at low proppant volumes. The data is shown below:

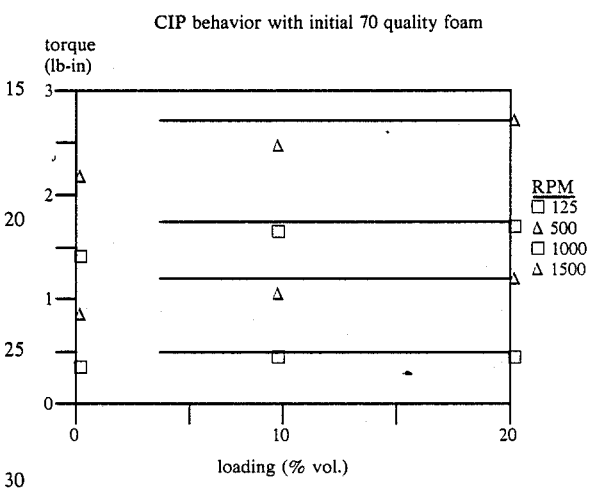

In sharp contrast the present invention provides a constant viscosity foam (CVF). Starting with an initial 70 quality foam, proppant was added using both the CIP and CVF procedures. The results are shown in the following graph:

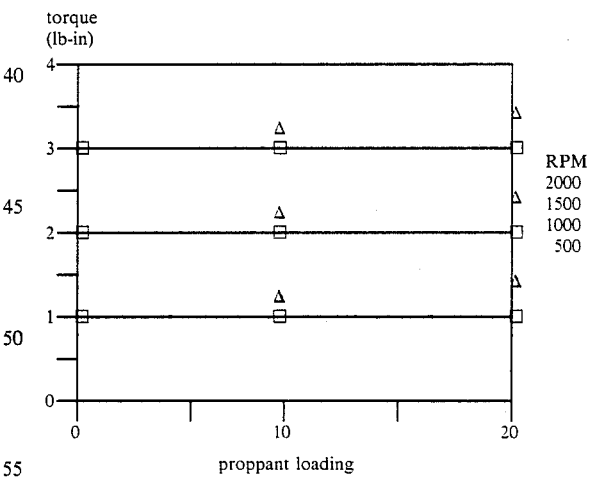

The CVF data is given by the square symbols and the CIP data is denoted by triangles and diamonds. Just as the present invention predicts, the CVF procedure maintains torque while the CIP procedure results in an increase in torque with proppant loading.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

TABLE 3

Torque readings in the CCR for 50, 60, and 70 quality foams at different RPM values. Results show maintenance of torque as polymer loading is reduced and proppant is added. Percent variation from unladen cases is also given. Torque measured in (lb —in.) corresponds to viscosity. SFS40 corresponds to a polymer loading of 40 lb per 1000 gallons.

SUMMARY OF RUNS
Constant Torque Values
Variable Polymer Loading

| RPM | 70Q N2 SFS40 No Solids | SFS35 5% Solids | % Error | SFS30 7.24% Solids | % Error | SFS25 10% Solids | % Error | SFS20 12.4% Solids | % Error | SFS10 15% Solids | % Error |
|---|---|---|---|---|---|---|---|---|---|---|---|
| 500 | 1.13 | 1.27 | 12.3894 | 1.26 | 11.5044 | 1.24 | 9.73451 | 1.38 | 22.1239 | 1.21 | 7.0796 |
| 1000 | 1.82 | 1.92 | 5.49451 | 1.9 | 4.3956 | 1.84 | 1.0989 | 1.9 | 4.3956 | 1.76 | −3.2967 |
| 1500 | 2.72 | 2.71 | −0.3676 | 2.73 | 0.36765 | 2.74 | 0.73529 | 2.77 | 1.83824 | 2.69 | −1.1029 |
| 2000 | 3.8 | 3.81 | 0.26316 | 3.82 | 0.52632 | 3.77 | −0.7895 | 3.89 | 2.6842 | 3.74 | −1.5789 |

| RPM | 60Q N2 SFS40 No Solids | SFS35 5% Solids | % Error | SFS30 10% Solids | % Error | SFS20 15% Solids | % Error | SFS15 19.34% Solids | % Error |
|---|---|---|---|---|---|---|---|---|---|
| 500 | 0.97 | 0.92 | −0.51546 | 1.05 | 8.24742 | 0.99 | 2.06186 | 1.07 | 10.3093 |
| 1000 | 1.65 | 1.6 | −3.0303 | 1.72 | 4.24242 | 1.63 | −1.2121 | 1.69 | 2.42424 |
| 1500 | 2.55 | 2.47 | −3.1373 | 2.57 | 0.78431 | 2.54 | −0.3922 | 2.65 | 3.92157 |
| 2000 | 3.62 | 3.53 | −2.4862 | 3.69 | 1.9337 | 3.49 | −3.5912 | 3.68 | 1.65746 |

| RPM | 50Q N2 SFS40 No Solids | SFS35 6.57% Solids | % Error | SFS30 12.07% Solids | % Error | SFS22.5 17.5% Solids | % Error | SFS20 20% Solids | % Error |
|---|---|---|---|---|---|---|---|---|---|
| 500 | 0.81 | 0.87 | 7.40741 | 0.88 | 8.64198 | 0.89 | 9.87654 | 0.94 | 16.0494 |
| 1000 | 1.6 | 1.6 | 0 | 1.62 | 1.25 | 1.58 | −1.25 | 1.63 | 1.875 |
| 1500 | 2.49 | 2.52 | 1.20482 | 2.46 | −1.2048 | 2.4 | −3.6145 | 2.48 | −0.4016 |
| 2000 | 3.47 | 3.56 | 2.59366 | 3.48 | 0.28818 | 3.43 | −1.1527 | 3.49 | 0.57637 |

What is claimed is:

1. A method of fracturing a subterranean formation penetrated by a well bore, comprising:

admixing a liquid containing varying quantities of a proppant material to form a slurry and varying quantities of a hydratable polymer with a foam-forming gas to form a three phase foam fracturing fluid mixture;

adjusting the quantities of at least one of the proppant material, foam-forming gas and hydratable polymer according to the formula I $$\mu_{mL} = \frac{\mu_m}{\mu_s} \cdot \frac{\mu_s}{\mu_p} \cdot \frac{\mu_p}{\mu_L} \qquad \text{I}$$

wherein $$\mu_{mL} = \frac{\mu_m}{\mu_L}$$

is the ratio of the viscosity of the three-phase mixture to the viscosity of the liquid;

$$\frac{\mu_m}{\mu_s}$$

is the ratio of the viscosity of the three-phase mixture to the viscosity of the slurry;

$$\frac{\mu_s}{\mu_p}$$

is the ratio of the viscosity of the slurry to the viscosity of polymer;

$$\frac{\mu_p}{\mu_L}$$

is the ratio of the viscosity of the polymer to the viscosity of the liquid, to at least substantially maintain a constant viscosity of said foam fracturing fluid; and introducing said constant viscosity foam fracturing fluid into said well bore penetrating said subterranean formation to cause a fracture to be formed in said subterranean formation.

2. The method of claim 1, wherein said gelling agent comprises a hydratable polymer present an amount from about 10 pounds to about 80 pounds per 1,000 gallons of aqueous fluid.

3. The method of claim 2, wherein said polymer comprises at least one member selected from the group consisting of guar gum, hydroxypropyl guar, guar derivatives, locus bean gum, carragcenan gum, xanthan gum, cellulose derivatives, polyacrylates, polymethacrylates, polyacrylamides, polyvinyl pyrrolidone and copolymers thereof.

4. The method of claim 1, wherein said proppant is present in an amount from about 0 to about 20 pounds per gallon of foam fracturing fluid.

5. The method of claim 1, wherein said foamed fracturing fluid includes at least one surfactant.

6. The method of claim 5, wherein said surfactant is present in concentration from 0.05% to about 2.0% by weight of the foamed fracturing fluid.

7. The method of claim 1, wherein said foam forming gas is selected from the the group consisting of nitrogen, air, natural gas, combustion gas, flue gas, carbon dioxide, and mixtures thereof.

8. The method of claim 1, wherein said proppant material is selected from the group consisting of sand, fine gravel, sintered bauxite and glass beads.

9. The method of claim 1 wherein the fracturing fluid exhibits torque readings which vary not more than ± 4%.

10. A method of fracturing a subterranean formation penetrated by a well bore, comprising:

admixing a liquid containing varying quantities of a proppant material to form a slurry and varying quantities of a hydratable polymer to form a fracturing fluid mixture;

adjusting the quantities of at least one of the proppant material and hydratable polymer according to formula II $$\mu_{mL} = \frac{\mu_m}{\mu_s} \cdot \frac{\mu_s}{\mu_p} \cdot \frac{\mu_p}{\mu_L} \quad \text{II}$$

wherein $$\mu_{mL} = \frac{\mu_m}{\mu_L}$$

is the ratio of the viscosity of the three-phase mixture of the viscosity of the liquid;

$$\frac{\mu_m}{\mu_s}$$

is the ratio of the viscosity of the two-phase mixture to the viscosity of the slurry;

$$\frac{\mu_s}{\mu_p}$$

is the ratio of the viscosity of the slurry to the viscosity of polymer;

$$\frac{\mu_p}{\mu_L}$$

is the ratio of the viscosity of the polymer to the viscosity of the liquid, to at least substantially maintain a constant viscosity of said fracturing fluid; and introducing said constant viscosity fracturing fluid into said well bore penetrating said subterranean formation to cause a fracture to be formed in said subterranean formation.

11. The method of claim 10, wherein said gelling agent comprises a hydratable polymer present an amount from about 10 pounds to about 80 pounds per 1,000 gallons of aqueous fluid.

12. The method of claim 11, wherein said polymer comprises at least one member selected from the group consisting of guar gum, hydroxypropyl guar, guar derivatives; locus bean gum, carragcenan gum, xanthan gum, cellulose derivatives, polyacrylates, polymethacrylates, polyacrylamides, polyvinyl pyrrolidone and copolymers thereof.

13. The method of claim 10, wherein said proppant is present in an amount from about 0 to about 20 pounds per gallon of fracturing fluid.

14. The method of claim 10, wherein said fracturing fluid includes a surfactant.

15. The method of claim 14, wherein said surfactant is present in concentration from 0.05% to about 2.0% by weight of the fracturing fluid.

16. The method of claim 10, wherein said proppant material is selected from the group consisting of sand, fine gravel, sintered bauxite and glass beads.

17. The method of claim 10 wherein the fracturing fluid exhibits torque readings which vary not more than ± 4%.

18. A method of fracturing a subterranean formation penetrated by a well bore, comprising:

admixing a liquid containing varying quantities of a proppant material to form a slurry and varying quantities of a hydratable polymer with a gas-forming liquid to form a three phase foam fracturing fluid mixture;

adjusting the quantities of at least one of the proppant material, the gas-forming liquid and the hydratable polymer according to the formula I $$\mu_{mL} = \frac{\mu_m}{\mu_s} \cdot \frac{\mu_s}{\mu_p} \cdot \frac{\mu_p}{\mu_L} \quad \text{I}$$

wherein $$\mu_{mL} = \frac{\mu_m}{\mu_L}$$

is the ratio of the viscosity of the three-phase mixture of the viscosity of the liquid;

$$\frac{\mu_m}{\mu_s}$$

is the ratio of the viscosity of the three-phase mixture to the viscosity of the slurry;

$$\frac{\mu_s}{\mu_p}$$

is the ratio of the viscosity of the slurry to the viscosity of polymer;

$$\frac{\mu_p}{\mu_L}$$

is the ratio of the viscosity of the polymer to the viscosity of the liquid, to at least substantially maintain a constant viscosity of said foam fracturing fluid; and introducing said constant viscosity foam fracturing fluid into said well bore penetrating said subterranean formation to cause a fracture to be formed in said subterranean formation.

19. The method of claim 18 wherein the fracturing fluid exhibits torque readings which vary not more than ± 4%.

* * * * *